(12) United States Patent
Heil et al.

(10) Patent No.: US 10,670,445 B1
(45) Date of Patent: Jun. 2, 2020

(54) SYSTEM AND METHOD FOR CONTROLLING OPERATION OF A VEHICLE BASED ON MEASURED FLUID LEVELS IN A FLUID RESERVOIR

(71) Applicant: GM Global Technology Operations LLC, Detroit, MI (US)

(72) Inventors: Edward T. Heil, Howell, MI (US); Kevin G. Weishuhn, Royal Oak, MI (US); Sean E. Zuzga, Westland, MI (US); Eric E. Krueger, Chelsea, MI (US); Steven J. Weber, Mt. Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/423,431

(22) Filed: May 28, 2019

(51) Int. Cl.
G01F 23/70    (2006.01)
F01M 11/12    (2006.01)
B60G 17/019   (2006.01)
B60K 15/06    (2006.01)
B60K 15/03    (2006.01)

(52) U.S. Cl.
CPC ....... *G01F 23/70* (2013.01); *B60G 17/01908* (2013.01); *F01M 11/12* (2013.01); *B60K 15/061* (2013.01); *B60K 2015/03223* (2013.01)

(58) Field of Classification Search
None
See application file for complete search history.

(56) References Cited

U.S. PATENT DOCUMENTS

2016/0231159 A1* 8/2016 Tiesman .................. G01F 23/30
2017/0152802 A1* 6/2017 Casetti ............... F02M 25/0836
2017/0369008 A1* 12/2017 Carlesimo ............... G01F 9/001

* cited by examiner

Primary Examiner — Carlos Garcia
(74) Attorney, Agent, or Firm — Quinn IP Law

(57) ABSTRACT

System and method for controlling operation of a vehicle having a fluid reservoir. The system includes one or more fluid level indicators configured to respectively obtain a measured fluid level in the fluid reservoir. A plurality of sensors is operatively connected to the vehicle and configured to respectively obtain one or more parameters. A controller is configured to determine if a fluid level transition between the measured fluid level and a past fluid level is indicated, when there is exactly one fluid level indicator. The controller is configured to identify a reporting state from among a first state, a second state and a third state, based in part on a correlation to a dynamic event and an expected direction for the fluid level transition. A control action is executed by the controller based in part on the reporting state.

20 Claims, 2 Drawing Sheets

SYSTEM AND METHOD FOR CONTROLLING OPERATION OF A VEHICLE BASED ON MEASURED FLUID LEVELS IN A FLUID RESERVOIR

INTRODUCTION

The present disclosure relates generally to a system and method for controlling operation of a vehicle based on measured fluid levels in a fluid reservoir in the vehicle. Vehicles may employ a variety of storage tanks or reservoirs for holding fluids used during operation and maintenance of the vehicle. The storage tanks or reservoirs are generally equipped with a sensor indicating the level of fluid contained within the respective storage tank or reservoir. Due to various external influences, e.g. the vehicle being on an incline, the fluid in the reservoir may slosh around, leading to the reporting of false fluid level transitions and unnecessary mitigation strategies. Additionally, a vehicle having multiple fluid level sensors may receive conflicting information from multiple readings in various situations.

SUMMARY

Disclosed herein is a system and method for controlling operation of a vehicle having a fluid reservoir. The system includes one or more fluid level indicators configured to respectively obtain a measured fluid level in the fluid reservoir. A plurality of sensors is operatively connected to the vehicle and configured to respectively obtain one or more parameters. A controller is in communication with the one or more fluid level indicators and has a processor and tangible, non-transitory memory on which instructions are recorded. Execution of the instructions by the processor causes the controller to, when a number of the one or more fluid level indicators is exactly one, determine if there is a fluid level transition between the measured fluid level and a predetermined past fluid level, i.e., if a fluid level transition is indicated. When the fluid level transition is indicated, the controller is configured to determine if the fluid level transition is correlated to a dynamic event, the dynamic event being defined as at least one of the one or more parameters exceeding a respective calibrated threshold within a predefined time window. An expected direction of the fluid level transition is determined when the fluid level transition is correlated to the dynamic event.

The controller is configured to identify a reporting state from among a first state, a second state and a third state, based in part on the correlation to the dynamic event and the expected direction. A control action based in part on the reporting state is then executed. The control action includes permitting the reporting of the measured fluid level when the first state is diagnosed, suppressing the reporting of the measured fluid level when the second state is diagnosed, and recording a diagnostic code indicative of a fault condition when the third state is diagnosed. The control action for the third state may include disabling a component of the vehicle when at least one enabling condition is met, e.g. the control action may include disabling a vehicle brake when the vehicle is stationary.

The one or more parameters may include a lateral acceleration, a longitudinal acceleration and a vehicle incline angle. The one or more parameters may include a road roughness parameter characterizing at least one of a road condition and a ride quality. Identifying the reporting state includes diagnosing the first state when the fluid level transition is not correlated to the dynamic event such that each of the one or more parameters is less than or equal to a respective calibrated threshold. Identifying the reporting state includes diagnosing the second state when at least one of the one or more parameters exceeds the respective calibrated threshold and the fluid level transition matches the expected direction. Identifying the reporting state includes diagnosing the third state when at least one of the one or more parameters exceeds the respective calibrated threshold and the fluid level transition does not match the expected direction.

When the number of the one or more fluid level indicators is at least two, the controller is configured to determine a degree of agreement between the measured fluid level respectively obtained by the one or more fluid level indicators. When the degree of agreement is at or above a predefined threshold, the controller is configured to select a current arbitrated fluid level as the measured fluid level for a majority of the one or more fluid level indicators. The controller is configured to determine if the current arbitrated fluid level matches a past arbitrated fluid level. The first state may be diagnosed when the current arbitrated fluid level matches the past arbitrated fluid level.

The controller is configured to determine if a difference between the current arbitrated fluid level and the past arbitrated fluid level is correlated to the dynamic event, based in part on the magnitude of the one or more parameters within the predefined time window, when the current arbitrated fluid level does not match the past arbitrated fluid level. The first state may be diagnosed when the difference is not correlated to the dynamic event. The second state may be diagnosed when the difference is correlated to the dynamic event and the difference matches an expected direction. The third state may be diagnosed when the difference is correlated to the dynamic event and the difference does not match the expected direction.

When the degree of agreement is below the predefined threshold, the controller is configured to determine if a deviation in the degree of agreement is correlated to the dynamic event, based in part on a magnitude of the one or more parameters within a predefined time window. The second state may be diagnosed when the deviation is correlated to the dynamic event. The third state may be diagnosed when the deviation is not correlated to the dynamic event.

The above features and advantages and other features and advantages of the present disclosure are readily apparent from the following detailed description of the best modes for carrying out the disclosure when taken in connection with the accompanying drawings.

DETAILED DESCRIPTION

Figure 1:
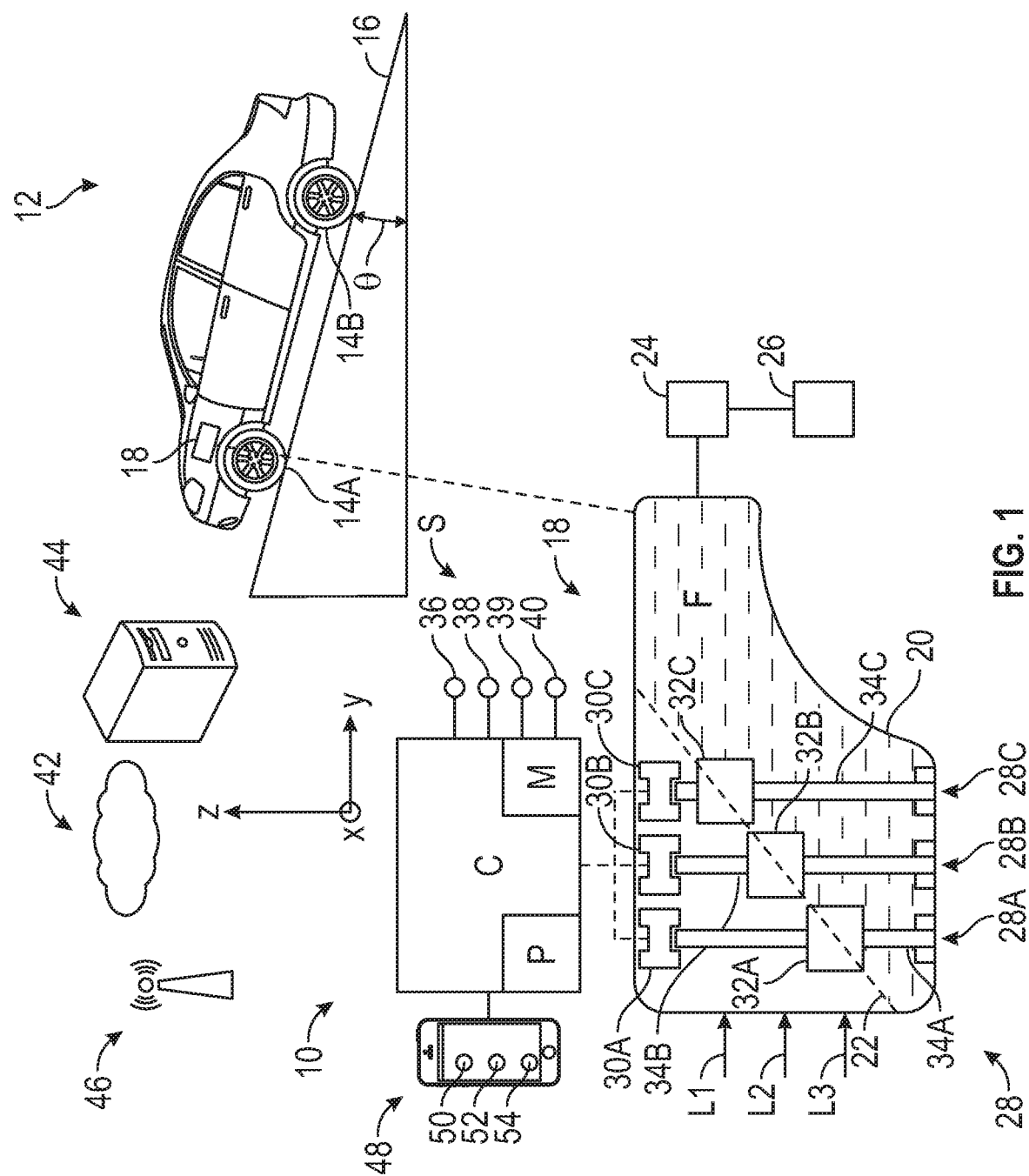
FIG. 1 is a schematic diagram of a system for controlling operation of a vehicle having a fluid reservoir and a controller.

Referring to the drawings, wherein like reference numbers refer to like components, FIG. 1 schematically illustrates a system 10 for controlling operation of a vehicle 12 in real-time. The vehicle 12 may be a mobile platform such as, but not limited to, a passenger car, sport utility car, light truck, heavy duty truck, all-terrain vehicle, minivan, bus, transit vehicle (e.g. subway), bicycle, robot, farm implement (e.g. tractor), sports-related equipment (e.g. golf cart), boat, airplane and train. The vehicle 12 may be an autonomous vehicle or it may be driven at least partially with the assistance of a user. The vehicle 12 may take many different forms and include multiple and/or alternate components and facilities.

Referring to FIG. 1, the vehicle 12 may include one or more wheels, such as first wheel 14A and second wheel 14B, for mobility on a surface 16. Referring to FIG. 1, the vehicle 12 includes a fluid reservoir 18 configured to hold a fluid F in a housing 20. Referring to FIG. 1, the fluid F defines a free fluid surface 22. In one example, the fluid F is brake fluid and the fluid reservoir 18 is configured to supply the brake fluid to a vehicle brake 24 or another hydraulic component 26 of the vehicle 12.

Referring to FIG. 1, the vehicle 12 includes one or more fluid level indicators 28 ("one or more" is omitted henceforth) that may be spaced apart or positioned at different locations in the fluid reservoir 18. The fluid level indicators 28 are configured to respectively determine or assess a measured fluid level in the fluid reservoir 18. The measured fluid level may include a number of discrete levels or may comprise of a continuous signal. In the example shown, the measured fluid levels are L1 (Normal), L2 (Low) and L3 (Very Low).

In one example, the fluid level indicators 28 are configured as magnetic reed switch sensors. Referring to FIG. 1, the fluid level indicators 28 may include a first fluid level sensor 28A, second fluid level sensor 28B and third fluid level sensor 28C having a respective stopper 30A, 30B, 30C and a respective float 32A, 32B, 32C mounted on a respective reed switch sensor 34A, 34B, 34C. The respective floats 32A, 32B, 32C incorporate a permanent magnet which may be hermetically sealed in a glass container. the respective reed switch sensor 34A, 34B, 34C are configured to determine the measured fluid level based on the varying magnetic field generated by the respective floats 32A, 32B, 32C rising and falling with the free fluid surface 22 in the fluid reservoir 18. It is understood that the mechanism employed by the fluid level indicators 28 may be varied based on the application at hand.

Referring to FIG. 1, the system 10 includes a controller C in communication with the fluid level indicators 28. The controller C has at least one processor P and at least one memory M (or non-transitory, tangible computer readable storage medium) on which instructions are recorded for executing method 100 (described in detail below with respect to FIG. 2) for controlling operation of the vehicle 12. The memory M can store controller-executable instruction sets, and the processor P can execute the controller-executable instruction sets stored in the memory M.

The controller C of FIG. 1 is specifically programmed to execute the blocks of the method 100 (as discussed below with respect to FIG. 2) and can receive inputs from various sensors. Referring to FIG. 1, system 10 may include a plurality of sensors S capable of respectively determining one or more parameters. The plurality of sensors S may include an inertial sensor 36 configured to obtain acceleration data of the vehicle 12 in multiple directions, including longitudinal acceleration and lateral acceleration. The inertial sensor 36 may include a respective accelerometer, gyroscope, and magnetometer (not shown) per axis for a pitch axis, a roll axis and a yaw axis. The inertial sensor 36 may be configured to determine an incline angle θ of the vehicle 12 relative to the surface of the earth (per the XYZ coordinate system shown in FIG. 1). The plurality of sensors S may include a suspension height sensor 38 detect a suspension height of the vehicle 12. Referring to FIG. 1, the plurality of sensors S may include at least one wheel speed sensor 39 configured to detect short transient bumps, i.e., oscillations in the wheel speeds. The short transient bumps may be indicative of fluid level slosh and variations in the measured fluid level.

Referring to FIG. 1, the plurality of sensors S may include a road sensor 40 configured to obtain information on road conditions and/or estimate a road roughness index, from various sources, including a cloud unit 42 and/or a remote server 44. Referring to FIG. 1, the road sensor 40 (via controller C) may be configured to communicate with the remote server 44 and the cloud unit 42, via a wireless network 46. The remote server 44 may be a public or commercial source of information available to those skilled in the art. The vehicle 12 may be configured to receive and transmit wireless communication to the remote server 44 through a mobile application 48, shown in FIG. 1. The mobile application 48 may be built into and run on an infotainment system of the vehicle 12.

Referring to FIG. 1, the mobile application 48 may include an embedded navigation sensor 50, which may be a global positioning satellite (GPS) sensor, configured to obtain location coordinates or location coordinates of the vehicle 12, such as for example, latitude and longitude values. Additionally, the mobile application 48 may include an embedded 3-axis accelerometer 52 and an embedded gyroscope 54. The road sensor 40 may be configured to receive vehicle-to-vehicle communication via the mobile application 48. The vehicle-to-vehicle communication may include information provided by other vehicles monitoring the condition of roads and detecting potholes. The circuitry and components of a remote server 44 and mobile application 48 ("apps") available to those skilled in the art may be employed. The mobile application 48 may be integral with, connected to (e.g. wired) or otherwise in communication with the controller C, such that it has access to the data in the controller C. Additionally, controller C may be programmed to determine other physical factors by modeling or other estimation techniques available to those skilled in the art.

As described below, the controller C is configured to identify a reporting state from among a first state, a second state and a third state, based in part on the magnitude of one or more parameters determined by the plurality of sensors S. A control action based in part on the reporting state is then executed. The control action includes permitting the reporting of the measured fluid level when the first state is diagnosed, suppressing the reporting of the measured fluid level when the second state is diagnosed, and recording a diagnostic code indicative of a fault condition when the third state is diagnosed.

Figure 2:
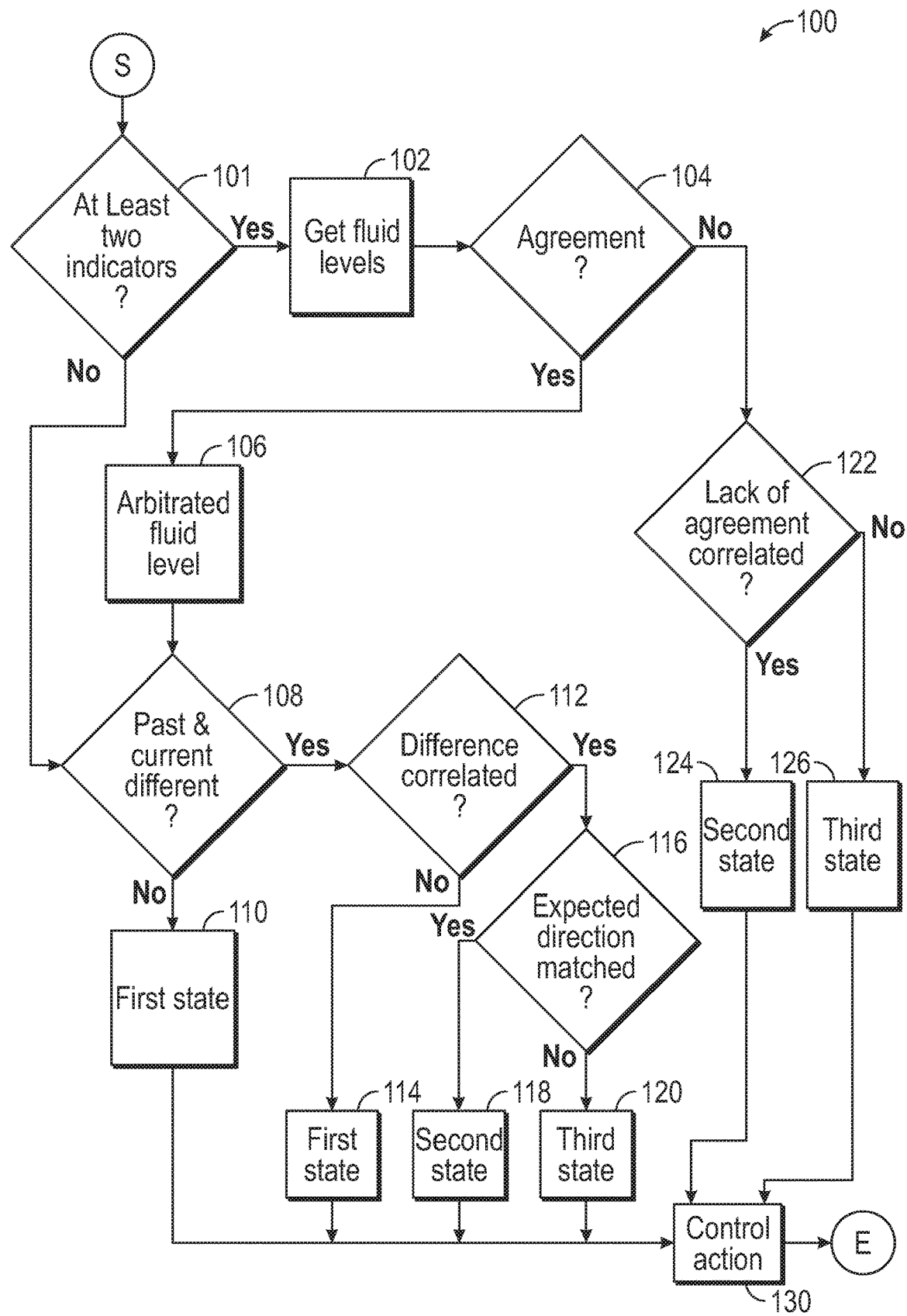
FIG. 2 is a schematic flow diagram for a method executable by the controller of FIG. 1.

Referring now to FIG. 2, a flowchart of the method 100 stored on and executable by the controller C of FIG. 1 is shown. Method 100 need not be applied in the specific order recited herein. Furthermore, it is to be understood that some steps may be eliminated. The start and end of the method 100 are indicated by "S" and "E," respectively. Per block 101 of FIG. 2, the controller C is configured to determine if there are at least two of the fluid level indicators 28. If so, the method 100 proceeds to block 102. If not, the method 100 proceeds to block 108.

If the number of the fluid level indicators 28 is exactly one, the method 100 proceeds to block 108 from block 101, where the controller C is programmed to determine if a fluid level transition between the measured fluid level (current) and a past fluid level is indicated. A fluid level transition is indicated when the measured fluid level (current) is different from past fluid level. For the fluid level sensor 28 shown in FIG. 1, the possible fluid level transitions include Normal to Low, Normal to Very Low, Low to Very Low, Low to Normal, Very Low to Normal, Very Low to Low. If there is no difference (or fluid level transition is not indicated) per block 110, the first state is diagnosed.

Per block 102, the controller C is configured to obtain the measured fluid levels obtained by the fluid level indicators 28. Per block 104, the controller C is configured to determine a degree of agreement between the measured fluid level respectively obtained by the fluid level indicators 28 (at least two). When the degree of agreement is at or above a predefined threshold agreement, method 100 proceeds to block 106, where the controller C is configured to select a current arbitrated fluid level as the measured fluid level for a majority (e.g. most common) of the one or more fluid level indicators. In one example, the predefined threshold agreement is selected to be 100%, in other words, unanimous agreement is required for the method 100 to proceed to block 106. In another example, the predefined threshold agreement is selected to be 80%, for example, that if four out of five fluid level indicators 28 in a vehicle 12 have the same measured fluid level, the method 100 proceeds to block 106. The current arbitrated fluid level is set as the most commonly occurring measured fluid level (reading from 80% of the fluid level indicators 28).

From block 106, the method 100 proceeds to block 108, where the controller C is configured to determine if the current arbitrated fluid level matches a past arbitrated fluid level, i.e., if a difference between the measured fluid level (current) and a past fluid level is found. The past arbitrated fluid level may be selected as the level found in the previous cycle of the method 100 and may be initialized to a predetermined state (e.g. "Normal") when the vehicle 12 is re-started.

If there is a difference (or fluid level transition is indicated), the method 100 proceeds to block 112 where the controller C is configured to determine if the difference (or fluid level transition) is correlated to a dynamic event, based in part on a magnitude of the one or more parameters within a predefined time window. Correlation with the dynamic event may be deemed to occur when at least one of the one or more parameters exceeds a respective calibrated threshold within a predefined time window coinciding with the time that the measured fluid level was obtained. Per block 114, the controller C is configured to diagnose the first state when the fluid level transition is not correlated to the dynamic event such that each of the one or more parameters is less than or equal to the respective calibrated threshold.

The one or more parameters may include a lateral acceleration, a longitudinal acceleration, and a vehicle incline angle. In one example, the respective calibrated threshold for longitudinal acceleration and lateral acceleration is 0.2 G and 0.1 G, respectively. The one or more parameters may include a road roughness parameter characterizing at least one of a road condition and a ride quality. The controller C may be programmed to assess the road roughness parameter as a function of the oscillations in the wheel speed of at least one wheel (obtained via the wheel speed sensor 39). For example:

Road Roughness Parameter=$k$*Variation of wheel speed over time, where k is a constant.
The controller C may be programmed to assess the road roughness parameter as a function of the suspension height of the vehicle 12 (obtained via the suspension height sensor 38). Alternately, the International Roughness Index (IRI) may be selected to be the road roughness parameter. The International Roughness Index is defined as the accumulated suspension motion divided by the distance traveled by the vehicle 12 and be calculated with a quarter-car vehicle model whose response at speed 80 km/h is accumulated to yield a roughness index with units of slope (in/mi, m/km, etc.). The International Roughness Index is a mathematical property of a two-dimensional road profile and may be calculated from profiles obtained by remote surveying equipment or by simulating the response of a model car to the road profile.

Per block 116, the controller C is configured to determine an expected direction of the difference (or fluid level transition) when the fluid level transition is correlated to the dynamic event. The expected direction of the difference (or fluid level transition) may be determined via a look-up table accessible to the controller C. By way of a non-limiting example, the expected direction of the difference may be set to a default step-down (e.g. Normal to Low, Low to Very Low) except for a set of defined categories or exceptions where the expected direction of the difference is a step-up (e.g. Low to Normal, Very Low to Low). For example, the category of exceptions may be defined as the incline angle ($\theta$) being within predefined limits ($\theta_1 < \theta < \theta_2$), the vertical suspension height being within a specific range. Additional constraints may be placed, including prohibition of double-step fluid level transitions (e.g. Normal to Very Low, Very Low to Normal) unless the vehicle 12 is re-starting.

Per block 118, the controller C is configured to diagnose the second state when at least one of the one or more parameters exceeds the respective calibrated threshold and the fluid level transition matches the expected direction. Per block 120, the controller C is configured to diagnose the third state when at least one of the one or more parameters exceeds the respective calibrated threshold and the fluid level transition does not match the expected direction.

When the degree of agreement is below the predefined threshold, the method 100 proceeds from block 104 to block 122, where the controller C is configured to determine if the deviation in the degree of agreement (or lack of agreement) is correlated to the dynamic event, based in part on a magnitude of the one or more parameters within a predefined time window. Correlation with the dynamic event may be deemed to occur when at least one of the one or more parameters exceeds the respective calibrated threshold within the predefined time window coinciding with the time that the measured fluid level was obtained. Per block 124, the controller C is configured to diagnose the second state when the deviation is correlated to the dynamic event. Per block 126, the controller C is configured to diagnose the third state when the deviation is not correlated to the dynamic event.

Once the reporting state has been identified (per blocks 110, 114, 118, 120, 124, 126), the method 100 proceeds to block 130, where the controller C is configured to execute a control action. The control action includes permitting the reporting of the measured fluid level when the first state is diagnosed, e.g., flashing a message on a user interface to alert a user of the vehicle 12. When the second state is diagnosed, the control action includes suppressing the reporting of the measured fluid level. Suppressing the reporting of the measured fluid level may include not sending the measured fluid level to other algorithms or programs within the controller C that are designed to consume this information. When the third state is diagnosed, the control action includes recording a diagnostic code indicative of a fault condition. If the vehicle 12 is an autonomous vehicle, the diagnostic code may be sent to a fleet manager via the wireless network 46 to follow-up for service and/or repair. The third state includes suppressing the reporting of the measured fluid level.

The control action for the third state may include disabling a component of the vehicle 12 when at least one enabling condition is met, e.g. disabling the vehicle brake 24 when the vehicle 12 is stationary. A transitional delay may be built in for the control action, based on vehicle factors and situational awareness, including but not limited to, vehicle speed, user-requested brake torque and acceleration values experienced. In other words, the control action may not be taken right away when the control action has been determined, but at a more opportune moment when one or more enabling conditions have been met. In one example, the control action includes. The enabling conditions may include the vehicle speed being zero and the brake pedal (not shown) not being engaged. The enabling conditions may include the vehicle acceleration within a specific time period being less than a predefined value (e.g. if the vehicle 12 is at highway speeds, the enabling conditions ensure the vehicle 12 has exited the highway).

The control action may include determining the total fluid volume in the fluid reservoir 18 based on the measured fluid level. If the total fluid volume is below a threshold volume, a leak in the fluid reservoir 18 may be presumed and a control action implemented after one or more enabling conditions have been met. The control action may be based on the magnitude of the total fluid volume in the fluid reservoir 18, with different remedial actions taken at different levels of the total fluid volume, e.g. disabling another hydraulic component 26 when the total fluid volume is below a predefined minimum. The system 10 enables preemptive action prior to the fluid F becoming empty, with the control action being executed with a transitional delay to minimize impact on the vehicle 12 and user.

In summary, the controller C may be configured to continually monitor the measured fluid levels for each of the one or more fluid level indicators 28. The controller C is programmed to analyze the one or more parameters (for example, lateral acceleration, longitudinal acceleration, road roughness) to determine the timeframe for the last dynamic event outside of predefined calibrated thresholds. A deviation between the measured fluid levels obtained by the fluid level indicators 28 is correlated against the timeframe for the last dynamic event. If a correlation between the one or more parameters and deviation between the measured fluid levels is high, the deviation is suppressed. The one or more parameters is cross checked with defined limits for which fluid level transitions are permitted or suppressed. The system 10 and/or execution of the method 100 improves the functioning of the vehicle 12 by reducing false positives and flagging system error responses. The system 10 provides the technical advantage of enabling decoupled diagnostics customized for specific operational states.

The controller C may include a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data stores may be included within a computing vehicle employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling operation of a vehicle having a fluid reservoir, the system comprising:
   one or more fluid level indicators configured to respectively obtain a measured fluid level in the fluid reservoir;
   a plurality of sensors operatively connected to the vehicle and configured to respectively obtain one or more parameters;
   a controller in communication with the one or more fluid level indicators and having a processor and tangible, non-transitory memory on which instructions are recorded, execution of the instructions by the processor causing the controller to:
      when a number of the one or more fluid level indicators is exactly one, determine if there is a fluid level transition between the measured fluid level and a predetermined past fluid level;
      when the fluid level transition is indicated, determine if the fluid level transition is correlated to a dynamic event, the dynamic event being defined as at least one of the one or more parameters exceeding a respective calibrated threshold within a predefined time window;

determine an expected direction of the fluid level transition when the fluid level transition is correlated to the dynamic event; and identify a reporting state from among a first state, a second state and a third state, based in part on a correlation to the dynamic event and the expected direction.

2. The system of claim 1, wherein the controller is configured to:

execute a control action based in part on the reporting state, the control action including:

permitting a reporting of the measured fluid level when the first state is diagnosed;

suppressing the reporting of the measured fluid level when the second state is diagnosed; and recording a diagnostic code indicative of a fault condition when the third state is diagnosed.

3. The system of claim 2, wherein the control action for the third state includes:

disabling a component of the vehicle when at least one enabling condition is met.

4. The system of claim 2, wherein the one or more parameters includes at least one of:

a lateral acceleration, a longitudinal acceleration, a vehicle incline angle and a road roughness parameter characterizing at least one of a road condition and a ride quality.

5. The system of claim 2, wherein identifying the reporting state includes:

diagnosing the first state when the fluid level transition is not correlated to the dynamic event such that each of the one or more parameters is less than or equal to the respective calibrated threshold.

6. The system of claim 5, wherein identifying the reporting state includes:

diagnosing the second state when at least one of the one or more parameters exceeds the respective calibrated threshold and the fluid level transition matches the expected direction.

7. The system of claim 6, wherein identifying the reporting state includes:

diagnosing the third state when at least one of the one or more parameters exceeds the respective calibrated threshold and the fluid level transition does not match the expected direction.

8. The system of claim 2, wherein the controller is configured to:

when the number of the one or more fluid level indicators is at least two, determine a degree of agreement between the measured fluid level respectively obtained by the one or more fluid level indicators;

when the degree of agreement is at or above a predefined threshold agreement, select a current arbitrated fluid level as the measured fluid level for a majority of the one or more fluid level indicators and determine if the current arbitrated fluid level matches a past arbitrated fluid level; and diagnose the first state when the current arbitrated fluid level matches the past arbitrated fluid level.

9. The system of claim 8, wherein the controller is configured to:

if the current arbitrated fluid level does not match the past arbitrated fluid level, determine if a difference between the current arbitrated fluid level and the past arbitrated fluid level is correlated to the dynamic event, based in part on a magnitude of the one or more parameters within the predefined time window;

diagnose the first state when the difference is not correlated to the dynamic event;

diagnose the second state when the difference is correlated to the dynamic event and the difference matches the expected direction; and diagnose the third state when the difference is correlated to the dynamic event and the difference does not match the expected direction.

10. The system of claim 8, wherein the controller is configured to:

when the degree of agreement is less the predefined threshold agreement, determine if a deviation in the degree of agreement is correlated to the dynamic event, based in part on a magnitude of the one or more parameters within the predefined time window;

diagnose the second state when the deviation is correlated to the dynamic event; and diagnose the third state when the deviation is not correlated to the dynamic event.

11. A method for controlling operation of a vehicle having a fluid reservoir, one or more fluid level indicators, a plurality of sensors and a controller with a processor and tangible, non-transitory memory on which instructions are recorded, the method comprising:

configuring the one or more fluid level indicators to respectively obtain a measured fluid level in the fluid reservoir;

configuring plurality of sensors to respectively obtain one or more parameters;

determining if a fluid level transition between the measured fluid level and a past fluid level is indicated, when a number of the one or more fluid level indicators is exactly one, via the controller;

determining if the fluid level transition is correlated to a dynamic event when a fluid level transition is indicated, the dynamic event being defined as at least one of the one or more parameters exceeding a respective calibrated threshold within a predefined time window, via the controller;

determining an expected direction of the fluid level transition when the fluid level transition is correlated to the dynamic event, via the controller; and identifying a reporting state from among a first state, a second state and a third state, based in part on a correlation to the dynamic event and the expected direction, via the controller.

12. The method of claim 11, further comprising:

executing a control action based in part on the reporting state, via the controller, the control action including permitting a reporting of the measured fluid level when the first state is diagnosed, suppressing the reporting of the measured fluid level when the second state is diagnosed, and recording a diagnostic code indicative of a fault condition when the third state is diagnosed.

13. The method of claim 12, wherein the control action for the third state includes:

disabling a component of the vehicle when at least one enabling condition is met.

14. The method of claim 12, wherein the one or more parameters includes at least one of a lateral acceleration, a longitudinal acceleration, a vehicle incline angle and a road roughness parameter characterizing at least one of a road condition and a ride quality.

15. The method of claim 12, wherein identifying the reporting state includes:
  diagnosing the first state when the fluid level transition is not correlated to the dynamic event such that each of the one or more parameters is less than or equal to the respective calibrated threshold.

16. The method of claim 15, wherein identifying the reporting state includes:
  diagnosing the second state when at least one of the one or more parameters exceeds the respective calibrated threshold and the fluid level transition matches the expected direction.

17. The method of claim 16, wherein identifying the reporting state includes:
  diagnosing the third state when at least one of the one or more parameters exceeds the respective calibrated threshold and the fluid level transition does not match the expected direction.

18. The method of claim 12, further comprising:
  determining a degree of agreement between the measured fluid level respectively obtained by the one or more fluid level indicators, when the number of the one or more fluid level indicators is at least two, via the controller;
  selecting the measured fluid level for a majority of the one or more fluid level indicators as a current arbitrated fluid level and determining if the current arbitrated fluid level matches a past arbitrated fluid level, when the degree of agreement is at or above a predefined threshold agreement, via the controller; and
  diagnosing the first state when the current arbitrated fluid level matches the past arbitrated fluid level, via the controller.

19. The method of claim 18, further comprising:
  determining if a difference between the current arbitrated fluid level and the past arbitrated fluid level is correlated to the dynamic event, based in part on a magnitude of the one or more parameters within the predefined time window, when the current arbitrated fluid level does not match the past arbitrated fluid level, via the controller;
  diagnosing the first state when the difference is not correlated to the dynamic event, via the controller;
  diagnosing the second state when the difference is correlated to the dynamic event and the difference matches the expected direction, via the controller; and
  diagnosing the third state when the difference is correlated to the dynamic event and the difference does not match the expected direction, via the controller.

20. The method of claim 18, further comprising:
  determining if a deviation in the degree of agreement is correlated to the dynamic event, based in part on a magnitude of the one or more parameters within the predefined time window, when the degree of agreement is less than the predefined threshold agreement, via the controller;
  diagnosing the second state when the deviation is correlated to the dynamic event, via the controller; and
  diagnosing the third state when the deviation is not correlated to the dynamic event, via the controller.

* * * * *